US005337071A

United States Patent [19]

East et al.

[11] Patent Number: 5,337,071

[45] Date of Patent: Aug. 9, 1994

[54] CONTINUOUS INK JET PRINTER

[75] Inventors: Amanda H. East; Richard W. Janse Van Rensburg, both of Cambridge, England

[73] Assignee: Elmjet Limited, Cambridge, England

[21] Appl. No.: 688,564

[22] PCT Filed: Dec. 20, 1989

[86] PCT No.: PCT/GB89/01518

§ 371 Date: Aug. 12, 1991

§ 102(e) Date: Aug. 12, 1991

[87] PCT Pub. No.: WO90/06854

PCT Pub. Date: Jun. 28, 1990

[30] Foreign Application Priority Data

Dec. 20, 1988 [GB] United Kingdom .............. 8829620.7

[51] Int. Cl.[5] .............................................. G01D 15/18

[52] U.S. Cl. .......................................... 347/77; 347/90

[58] Field of Search ........................ 346/1.1, 75, 140 R

[56] References Cited

U.S. PATENT DOCUMENTS

| | | | |
|---|---|---|---|
| 3,836,914 | 9/1974 | Duffield | 346/75 |
| 4,027,309 | 5/1977 | Manning et al. | 346/1.1 |
| 4,035,811 | 7/1977 | Paranjpe | 346/75 |
| 4,266,231 | 5/1981 | Drago et al. | 346/75 |
| 4,297,712 | 10/1981 | Lammers et al. | 346/75 |
| 4,375,062 | 2/1983 | Sturm | 346/75 |
| 4,520,366 | 5/1985 | Cragin, Jr. | 346/1.1 |
| 4,591,869 | 5/1986 | Katerberg et al. | 346/1.1 |
| 4,600,928 | 7/1986 | Braun et al. | 346/1.1 |
| 4,623,897 | 11/1986 | Brown et al. | 346/75 |
| 4,703,330 | 10/1987 | Culpepper | 346/75 |
| 4,841,306 | 6/1989 | Archer et al. | 346/1.1 |
| 4,841,307 | 6/1989 | Graham | 346/1.1 |
| 5,142,297 | 8/1992 | Eijkman et al. | 346/1.1 |

*Primary Examiner*—A. T. Grimley
*Assistant Examiner*—T. A. Dang
*Attorney, Agent, or Firm*—Kokjer, Kircher, Bowman & Johnson

[57] ABSTRACT

A continuous ink jet printer has main deflection electrodes 7 and 8 and a subsidiary deflection electrode 14 having a recess front face 16 which defines a cavity 17. Unwanted satellite droplets entrained by the main droplets 4 are deflected into, and form vortices in, the cavity 17, before coalescing on the surface of the electrode 14 for collection.

24 Claims, 1 Drawing Sheet

CONTINUOUS INK JET PRINTER

DESCRIPTION

In continuous ink jet printers the natural instability of at least one jet of ink is driven by a modulating mechanism at a suitable frequency to produce a well defined train of droplets. During the break up of the jet into the discrete droplets, a secondary instability occurs when the ligaments joining the droplets finally snap. This results in a secondary set of micro-droplets, of radius less than 1$\mu$, which are entrained with the main droplets. In order to print, the droplets are individually and selectively charged as they pass a charging electrode assembly and are then deflected or not, depending upon whether they are charged or not, as they pass through an electrostatic field adjacent to at least one deflection electrode. Either the deflected charged droplets are used for printing and the uncharged undeflected droplets are collected in a gutter, or vice versa. It is unavoidable that many of the micro-droplets also become charged, but, because their charge to mass ratio differs from that of the main droplets, they do not follow the same trajectory as the main droplets. Indeed their deflection is greater, and their trajectories more random, than those of the main droplets, particularly as the charged micro-droplets will have the same polarity as charged main droplets and be repelled by them. If left uncontrolled the micro-droplets produce deposits at undesirable places inside the print head and these eventually grow large enough to interefere with the printing mechanism. The problem is particularly acute in systems which are now becoming preferred, in which uncharged undeflected droplets are used for printing as in that case the majority of the droplets are charged. The phenomenon is particularly significant in high resolution printers, which use fast-drying inks, and which are required to run continuously for extended periods of time.

In accordance with the present invention, in a continuous ink jet printer of the kind comprising means for producing at least one jet of ink, a modulating mechanism for causing the jet to break up into a train of main droplets, a charging electrode assembly for selectively applying an electrostatic charge to the droplets, and at least one deflection electrode for producing an electrostatic field to deflect charged ones of the droplets so that either the deflected charged droplets or the undeflected uncharged droplets are used for printing, the other main droplets being collected by a gutter; there is provided adjacent to the upstream end of the deflection electrode (s) and to the side of the train towards which the charged droplets are deflected, a subsidiary electrode portion defining a cavity which opens towards the path of the train of droplets and arranged such that air entrained by the train of droplets produces, use, a vortex in the cavity, the subsidiary electrode portion being at a potential such that any charged micro-droplets in the train are initially deflected out of the train towards the subsidiary electrode portion, whereupon they are entrained by the air flow and carried into the cavity where they are deposited. This controlled deposit of the micro-droplets in a safe area very beneficial.

In a multi-jet printer, in which there is a planar array of trains of droplets, there will be a common cavity extending parallel to the plane of the array and perpendicular to the flight paths of the trains of droplets.

The subsidiary electrode portion may form an upstream end part of the or one deflection electrode. However, in order to avoid any unnecessary increase in the droplet flight path: an adjacent deflection electrode is preferably foreshortened at its upstream end to accommodate the subsidiary electrode portion, from which it is insulated, and the subsidiary electrode portion is controlled at a different potential from the adjacent deflection electrode, so that, in spite of the cavity causing at least part of the subsidiary electrode portion to be spaced further from the droplet train path(s) than the adjacent deflection electrode: there will be substantially no reduction in the electrostatic field flux adjacent to the subsidiary electrode portion for deflection of the main droplets.

When, as is usual, there are opposed deflection electrodes, between which the droplet train(s) pass(es), the electrode portion may overlap, in the direction of droplet flight path(s), the upstream end of the opposite deflection electrode, in which case the cavity may be defined by a concave or angular surface so that the surface is generally equidistant from the upstream edge of the opposed deflection electrode whereby the electrostatic field between the upstream edge of the opposed deflection electrode and the surface of the cavity is substantially constant.

In the case of a bipolar system in which the droplets may be deflected in one or the other direction, it may be necessary to provide subsidiary electrode portions and cavities on both sides of the droplet path(s) .

The deposited ink may collect in the cavity and be cleaned out at regular intervals. However this could be effected automatically if the ink is not unduly quick drying: by forming the subsidiary electrode portion of a porous material, and providing a suction through the back of the subsidiary electrode portion, so that ink deposited in the cavity is dragon through the subsidiary electrode portion and sucked out to a reservoir for reuse, or to waste.

An example of part of an ink jet printer constructed in accordance with the present invention is illustrated in the accompanying drawings, in which.

Figure 2:
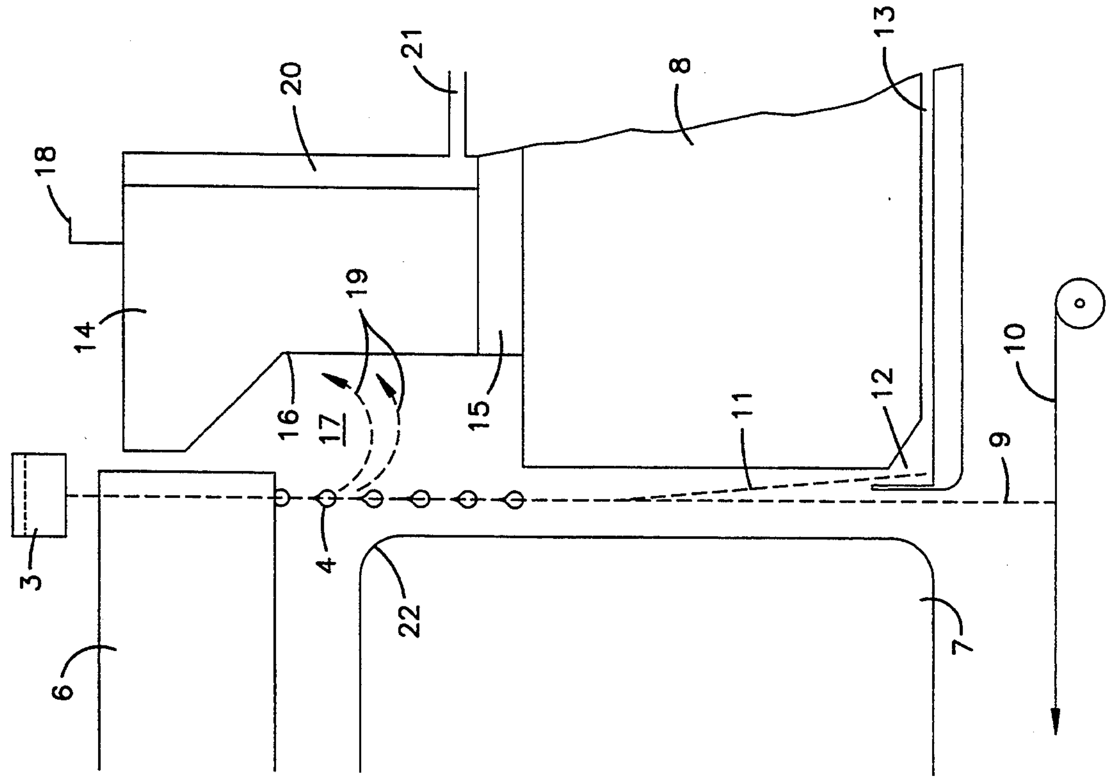
FIG. 2 is an elevation of the other side.
Figure 1:
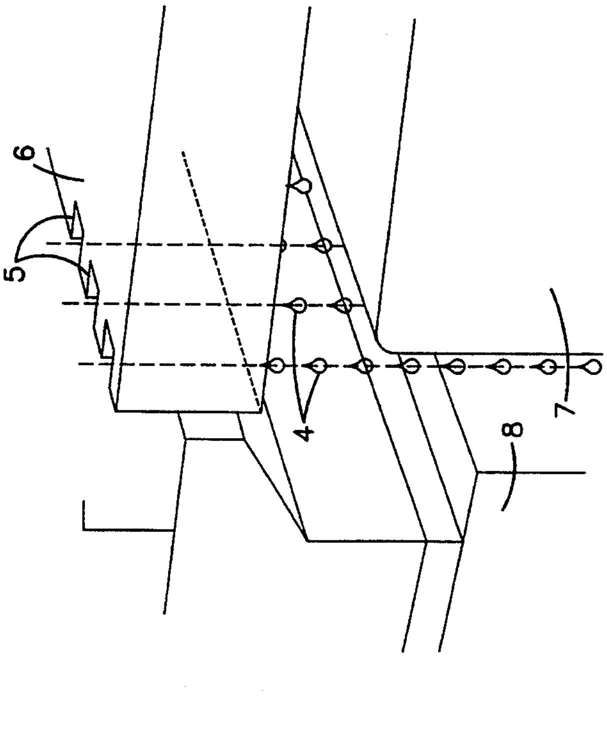
FIG. 1 is a perspective view from one side.

The printer has, in conventional fashion, an ink chamber 3, to which ink is supplied from a reservoir under pressure, so that the ink continuously leaves the bottom of the chamber 3 as jets through a row of fine nozzles. The chamber 3 incorporates a modulating mechanism which causes these jets to break up into parallel trains of main droplets 4. The trains passed through slots 5 in the face of a comb-like charging electrode 6 so that individual droplets are selectively charged electrostatically. The trains of droplets then pass between deflector electrodes 7 and 8, which are electrically charged so that at selected times uncharged droplets continue along a path 9 and impinge on a moving web 10 to print on the web. The charged droplets are deflected along a path 11 into a gutter 12 at the bottom of the electrode 8, and the ink formed by the coalesced droplets is sucked out through a vacuum line 13. Thus far the printer is conventional.

The inventive feature is exemplified by the provision of a subsidiary electrode 14 above, and spaced by electrical insulation 15, from the deflection electrode 8, and facing the uppermost part of the deflection electrode 7. The front face 16 of the electrode 14 is recessed, as Compared to the front face of the electrode 8, to provide a cavity 17. A voltage higher than that applied to the electrode 8, of the opposite polarity to electrode 7, can be applied to the electrode 14 through a terminal 18. Assuming a constant voltage on electrode 7, there is then a constant electrostatic field between the electrodes 7 and 14. The effect of this is that the passage of main droplets past the cavity 17 generates vortices in the air flow within the cavity, and any satellite microdroplets produced by the trains of main droplets 4 will be preferentially attracted towards the cavity 17 and will become entrained in the vortices as indicated by the arrows 19. These microdroplets eventually coalesce on the front surface 16 of the electrode 14 and are removed. The removal might either be by drawing them through porous material forming the electrode 14, and hence into a manifold 20 and out through a vacuum pipe 21, or perhaps by allowing the coalesced drops to run down the face of the electrode 14 and to be caught in a gutter similar to the gutter 12.

The face 16 of the electrode 14 is angular so as to approximate to a constant spacing from the upper front corner 22 of the electrode 7.

We claim:

1. In a continuous ink jet printer of the kind comprising means for producing at least one jet of ink, a modulating mechanism for causing the jet to break up into a train of main droplets and micro-droplets, a charging electrode assembly for selectively applying an electrostatic charge to the droplets, and at least one deflection electrode for producing an electrostatic field to deflect charged ones of the droplets so that either the deflected charged droplets or the undeflected charged droplets are used for printing, the other main droplets being collected by a gutter; the improvement comprising:

a subsidiary electrode portion adjacent to an upstream end of said deflection electrode and to a side of the train towards which the charged droplets are deflected, said subsidiary electrode portion defining a cavity which opens toward the path of the train of droplets and arranged such that air entrained by the train of droplets produces, in use, a vortex in said cavity, said subsidiary electrode portion being at an electric potential such that any charged ones of the micro-droplets in the train are initially deflected out of the train towards said subsidiary electrode portion, whereupon they are entrained by air flow and carried into said cavity where they are deposited.

2. The improvement of claim 1, in which said subsidiary electrode portion is formed of a porous material, and there are means for providing a suction through said subsidiary electrode portion, so that ink deposited in said cavity is drawn through said subsidiary electrode portion and sucked out to a reservoir for reuse, or to waste.

3. The improvement of claim 1, in which said at least one deflection electrode comprises opposed deflection electrodes, between which the droplet train(s) pass(es), said subsidiary electrode portion overlapping, in a direction of the droplet path(s), an upstream end of an opposed one of said deflection electrodes; and said cavity being defined by a concave or angular surface of said subsidiary electrode portion so that said surface is generally equidistant from an upstream edge of said opposed deflection electrode whereby an electrostatic field between said upstream edge of said opposed deflection electrode and said surface of said cavity is substantially constant.

4. The improvement of claim 3, in which said subsidiary electrode portion is formed of a porous material, and there are means for providing a suction through said subsidiary electrode portion, so that ink deposited in said cavity is drawn through said subsidiary electrode portion and sucked out to a reservoir for reuse, or to waste.

5. The improvement of claim 1, in which said subsidiary electrode portion forms an upstream end part of at least one said deflection electrode.

6. The improvement of claim 5, in which said subsidiary electrode portion is formed of a porous material, and there are means for providing a suction through said subsidiary electrode portion, so that ink deposited in said cavity is drawn through said subsidiary electrode portion and sucked out to a reservoir for reuse, or to waste.

7. The improvement of claim 5, in which said at least one deflection electrode comprises opposed deflection electrodes, between which the droplet train(s) pass(es), said subsidiary electrode portion overlapping, in a direction of the droplet path(s), an upstream end of an opposed one of said deflection electrodes; and said cavity being defined by a concave or angular surface of said subsidiary electrode portion so that said surface is generally equidistant from an upstream edge of said opposed deflection electrode whereby an electrostatic field between said upstream edge of said opposed deflection electrode and said surface of said cavity is substantially constant.

8. The improvement of claim 7, in which said subsidiary electrode portion is formed of a porous material, and there are means for providing a suction through said subsidiary electrode portion, so that ink deposited in said cavity is drawn through said subsidiary electrode portion and sucked out to a reservoir for reuse, or to waste.

9. The improvement of claim 5, in which said at least one deflection electrode (8) is foreshortened at an upstream end thereof to accommodate said subsidiary electrode portion, from which it is electrically insulated, and said subsidiary electrode portion is controlled at a different electric potential from the adjacent said deflection electrode.

10. The improvement of claim 9, in which said subsidiary electrode portion is formed of a porous material, and there are means for providing a suction through said subsidiary electrode portion, so that ink deposited in said cavity is drawn through said subsidiary electrode portion and sucked out to a reservoir for reuse, or to waste.

11. The improvement of claim 9, in which said at least one deflection electrode comprises opposed deflection electrodes, between which the droplet train(s) pass(es), said subsidiary electrode portion overlapping, in a direction of the droplet path(s), an upstream end of an opposed one of said deflection electrodes; and said cavity being defined by a concave or angular surface of said subsidiary electrode portion so that said surface is generally equidistant from an upstream edge of said opposed deflection electrode whereby an electrostatic field between said upstream edge of said opposed deflection electrode and said surface of said cavity is substantially constant.

12. The improvement of claim 11, in which said subsidiary electrode portion is formed of a porous material, and there are means for providing a suction through said subsidiary electrode portion, so that ink deposited in said cavity is drawn through said subsidiary electrode portion and sucked out to a reservoir for reuse, or to waste.

13. The improvement of claim 1, in which there is a planar array of trains of the droplets, said cavity extending parallel to the planar array and perpendicular to the paths of the trains of droplets.

14. The improvement of claim 13, in which said subsidiary electrode portion is formed of a porous material, and there are means for providing a suction through said subsidiary electrode portion, so that ink deposited in said cavity is drawn through said subsidiary electrode portion and sucked out to a reservoir for reuse, or to waste.

15. The improvement of claim 13, in which said at least one deflection electrode comprises opposed deflection electrodes, between which the droplet train(s) pass(es), said subsidiary electrode portion overlapping, in a direction of the droplet path(s), an upstream end of an opposed one of said deflection electrodes; and said cavity being defined by a concave or angular surface of said subsidiary electrode portion so that said surface is generally equidistant from an upstream edge of said opposed deflection electrode whereby an electrostatic field between said upstream edge of said opposed deflection electrode and said surface of said cavity is substantially constant.

16. The improvement of claim 15, in which said subsidiary electrode portion is formed of a porous material, and there are means for providing a suction through said subsidiary electrode portion, so that ink deposited in said cavity is drawn through said subsidiary electrode portion and sucked out to a reservoir for reuse, or to waste.

17. The improvement of claim 13, in which said subsidiary electrode portion forms an upstream end part of at least one said deflection electrode.

18. The improvement of claim 17, in which said subsidiary electrode portion is formed of a porous material, and there are means for providing a suction through said subsidiary electrode portion, so that ink deposited in said cavity is drawn through said subsidiary electrode portion and sucked out to a reservoir for reuse, or to waste.

19. The improvement of claim 17, in which said at least one deflection electrode comprises opposed deflection electrodes, between which the droplet train(s) pass(es), said subsidiary electrode portion overlapping, in a direction of the droplet path(s), an upstream end of an opposed one of said deflection electrodes; and said cavity being defined by a concave or angular surface of said subsidiary electrode portion so that said surface is generally equidistant from an upstream edge of said opposed deflection electrode whereby an electrostatic field between said upstream edge of said opposed deflection electrode and said surface of said cavity is substantially constant.

20. The improvement of claim 19, in which said subsidiary electrode portion is formed of a porous material, and there are means for providing a suction through said subsidiary electrode portion, so that ink deposited in said cavity is drawn through said subsidiary electrode portion and sucked out to a reservoir for reuse, or to waste.

21. The improvement of claim 17, in which said at least one deflection electrode (8) is foreshortened at an upstream end thereof to accommodate said subsidiary electrode portion, from which it is electrically insulated, and said subsidiary electrode portion is controlled at a different electric potential from the adjacent said deflection electrode.

22. The improvement of claim 21, in which said subsidiary electrode portion is formed of a porous material, and there are means for providing a suction through said subsidiary electrode portion, so that ink deposited in said cavity is drawn through said subsidiary electrode portion and sucked out to a reservoir for reuse, or to waste.

23. The improvement of claim 21, in which said at least one deflection electrode comprises opposed deflection electrodes, between which the droplet train(s) pass(es), said subsidiary electrode portion overlapping, in a direction of the droplet path(s), an upstream end of an opposed one of said deflection electrodes; and said cavity being defined by a concave or angular surface of said subsidiary electrode portion so that said surface is generally equidistant from an upstream edge of said opposed deflection electrode whereby an electrostatic field between said upstream edge of said opposed deflection electrode and said surface of said cavity is substantially constant.

24. The improvement of claim 23, in which said subsidiary electrode portion is formed of a porous material, and there are means for providing a suction through said subsidiary electrode portion, so that ink deposited in said cavity is drawn through said subsidiary electrode portion and sucked out to a reservoir for reuse, or to waste.

* * * * *